(12) United States Patent
Sawada et al.

(10) Patent No.: US 12,217,485 B2
(45) Date of Patent: Feb. 4, 2025

(54) OBJECT RECOGNITION DEVICE, METHOD, AND COMPUTER-READABLE MEDIUM

(71) Applicant: NEC Corporation, Tokyo (JP)

(72) Inventors: Azusa Sawada, Tokyo (JP); Soma Shiraishi, Tokyo (JP); Takashi Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/768,597

(22) PCT Filed: Oct. 24, 2019

(86) PCT No.: PCT/JP2019/041632
§ 371 (c)(1),
(2) Date: Apr. 13, 2022

(87) PCT Pub. No.: WO2021/079451
PCT Pub. Date: Apr. 29, 2021

(65) Prior Publication Data
US 2024/0112447 A1     Apr. 4, 2024

(51) Int. Cl.
*G06V 10/772*     (2022.01)
*G06F 16/55*     (2019.01)
(Continued)

(52) U.S. Cl.
CPC .......... *G06V 10/7715* (2022.01); *G06F 16/55* (2019.01); *G06V 10/772* (2022.01);
(Continued)

(58) Field of Classification Search
CPC ............. G06V 10/7715; G06V 10/772; G06V 10/774; G06V 10/82; G06V 10/778–7796; G06F 16/55
See application file for complete search history.

(56) References Cited

U.S. PATENT DOCUMENTS 9,002,101 B2 * 4/2015 Nakai ................... G06F 18/217
382/157
11,176,424 B2 * 11/2021 Seo ........................ G06V 10/40
(Continued)

FOREIGN PATENT DOCUMENTS

CN         106803063 A  *  6/2017
JP         2012-027617 A    2/2012
(Continued)

OTHER PUBLICATIONS

International Search Report for PCT Application No. PCT/JP2019/041632, mailed on Jan. 28, 2020.
(Continued)

*Primary Examiner* — Scott A Rogers
(74) *Attorney, Agent, or Firm* — Sughrue Mion, PLLC

(57) ABSTRACT

The learning device includes a metric space learning unit and a case example storage unit. The metric space learning unit learns a metric space including feature vectors extracted from attributed image data, for each combination of different attributes, using the attributed image data to which attribute information is assigned. The case example storage unit computes the feature vector from the image data for case example to store the computed feature vector as a case example associated with the metric space, and stores additional information associated with the case example.

12 Claims, 9 Drawing Sheets

(51) Int. Cl.
  *G06V 10/77* (2022.01)
  *G06V 10/774* (2022.01)
  *G06V 10/778* (2022.01)
  *G06V 10/82* (2022.01)

(52) U.S. Cl.
  CPC .......... *G06V 10/774* (2022.01); *G06V 10/778* (2022.01); *G06V 10/82* (2022.01)

(56) References Cited

U.S. PATENT DOCUMENTS

| | | | |
|---|---|---|---|
| 11,334,772 B2 * | 5/2022 | Toizumi | G06F 18/214 |
| 11,568,245 B2 * | 1/2023 | Chang | G06N 5/02 |
| 12,008,074 B2 * | 6/2024 | Shiraishi | G06T 7/00 |
| 2010/0142821 A1 | 6/2010 | Hosoi | |
| 2017/0206465 A1 * | 7/2017 | Jin | G06F 16/5866 |
| 2019/0050983 A1 | 2/2019 | Chen et al. | |
| 2020/0042883 A1 * | 2/2020 | Sato | G06F 18/217 |
| 2020/0193552 A1 * | 6/2020 | Turkelson | G06F 18/24143 |
| 2022/0027764 A1 * | 1/2022 | Lafond | G06N 3/08 |
| 2022/0335291 A1 * | 10/2022 | Sawada | G06N 3/08 |

FOREIGN PATENT DOCUMENTS

| | | |
|---|---|---|
| JP | 2019-030584 A | 2/2019 |
| JP | 2019-061494 A | 4/2019 |
| WO | 2008/126790 A1 | 10/2008 |
| WO | 2018/116921 A1 | 6/2018 |

OTHER PUBLICATIONS

Simonyan et al., "Very Deep Convolutional Networks for Large-Scale Image Recognition", Published as a conference paper at ICLR 2015, arXiv:1409.1556v6 [cs.CV] Apr. 10, 2015, pp. 1-14.

* cited by examiner

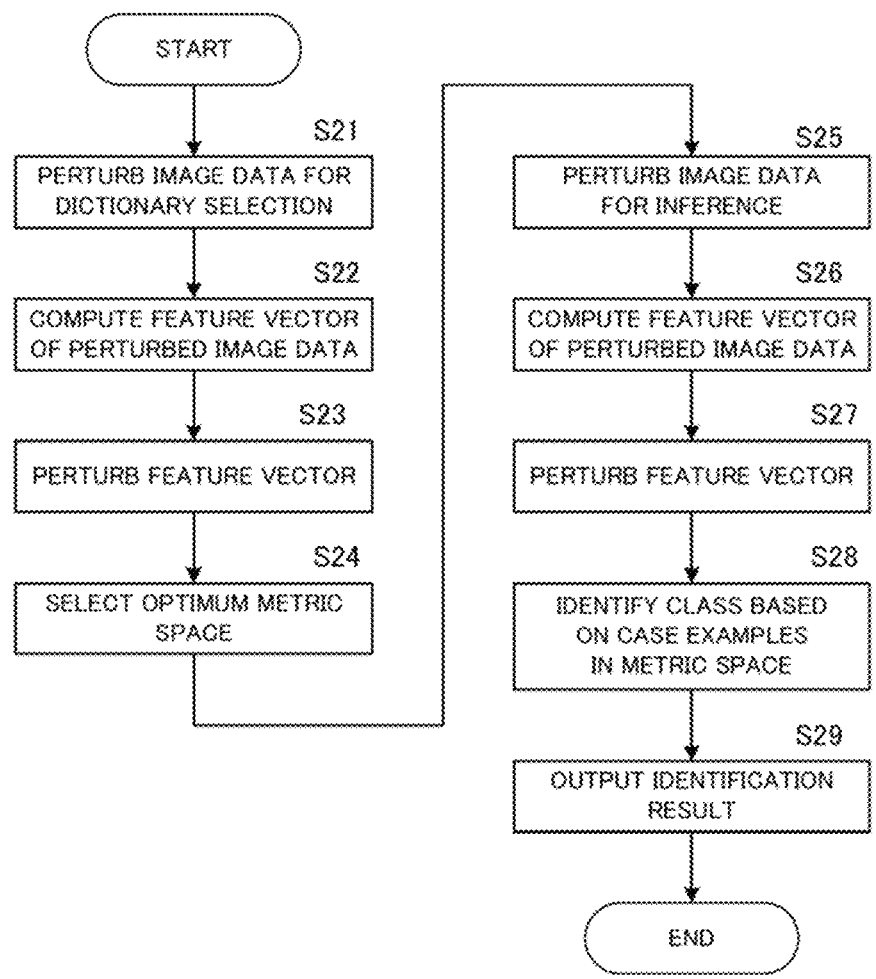

OBJECT RECOGNITION DEVICE, METHOD, AND COMPUTER-READABLE MEDIUM

This application is a National Stage Entry of PCT/JP2019/041632 filed on Oct. 24, 2019, the contents of all of which are incorporated herein by reference, in their entirety.

TECHNICAL FIELD

The present invention relates to a technique for recognizing an object contained in an image.

BACKGROUND ART

There is known an object recognition technique for recognizing objects in an image acquired by an imaging device such as a camera. For example, Patent Document 1 and Non-Patent Document 1 describe an object recognition technique for performing learning and identification using a neural network.

In the learning in the object recognition technique described above, the learning of the identification model is performed such that an image of an object belonging to one of the categories registered in advance (registered categories) as an identification target is inputted to a predetermined identification model and the identification score for the category is increased. After the learning of the identification model, when an image of an object whose category is unknown is inputted to the learned identification model, the identification score for each of the registered categories is outputted from the identification model described above. In addition, Non-Patent Document 1 also describes that a predetermined threshold value is provided with respect to the identification score, and when the identification score is smaller than the above threshold value, it is determined that an object of the registered category cannot be detected and the identification result is rejected.

PRECEDING TECHNICAL REFERENCES

Patent Document

Patent Document 1: International Publication WO2008/126790

Non-Patent Document

Non-Patent Document 1: Karen Simonyan, and Andrew Zisserman, "Very Deep Convolutional Networks for Large-Scale Image Recognition", ICLR, 2015.

SUMMARY

Problem to be Solved by the Invention

However, the above-described method can only reject the identification target of the unregistered category and cannot identify the identification target of the unregistered category. Also, since the conventional identification technique only performs the identification, it is difficult to interpret the validity of the identification result intuitively.

One object of the present invention is to cope with images acquired in various environments and output a recognition result in a manner easy to determine the validity of the recognition result for the identification target of unregistered category.

Means for Solving the Problem

According to an example aspect of the present invention, there is provided a learning device comprising:
 a metric space learning unit configured to learn a metric space including feature vectors extracted from attributed image data, for each combination of different attributes, using the attributed image data to which attribute information is assigned; and
 a case example storage unit configured to compute the feature vector from the image data for case example to store the computed feature vector as a case example associated with the metric space, and store additional information associated with the case example.

According to another example aspect of the present invention, there is provided a learning method comprising:
 learning a metric space including feature vectors extracted from attributed image data, for each combination of different attributes, using the attributed image data to which attribute information is assigned; and
 computing the feature vector from the image data for case example to store the computed feature vector as a case example associated with the metric space, and storing additional information associated with the case example.

According to still another example aspect of the present invention, there is provided a recording medium recording a program causing a computer to execute processing of:
 learning a metric space including feature vectors extracted from attributed image data, for each combination of different attributes, using the attributed image data to which attribute information is assigned; and
 computing the feature vector from the image data for case example to store the computed feature vector as a case example associated with the metric space, and storing additional information associated with the case example.

According to still another example aspect of the present invention, there is provided an inference device comprising:
 a case example storage unit configured to store a feature vector of image data for case example in association with a metric space learned for each combination of different attributes, and store additional information associated with the case example;
 an identification unit configured to identify image data for inference based on the feature vector extracted from the image data for inference and the case example associated with the metric space; and
 a result output unit configured to output an identification result by the identification unit with the additional information associated with the case example used for identification.

According to still another example aspect of the present invention, there is provided an inference method comprising:
 acquiring a metric space from a case example storage unit which stores a feature vector of image data for case example in association with a metric space learned for each combination of different attributes, and which stores additional information associated with the case example;
 identifying image data for inference based on a feature vector extracted from the image data for inference and the case example associated with the metric space; and
 outputting an identification result by the identification unit with the additional information associated with the case example used for identification.

According to still another example aspect of the present invention, there is provided a recording medium recording a program causing a computer to execute processing of:

acquiring a metric space from a case example storage unit which stores a feature vector of image data for case example in association with a metric space learned for each combination of different attributes, and which stores additional information associated with the case example;

identifying image data for inference based on a feature vector extracted from the image data for inference and the case example associated with the metric space; and outputting an identification result by the identification unit with the additional information associated with the case example used for identification.

Effect of the Invention

According to the present invention, it becomes possible to cope with images acquired in various environments and output a recognition result for the identification target of unregistered category.

BRIEF DESCRIPTION OF THE DRAWINGS

FIG. 7 is a flowchart of inference processing by the object recognition device for inference.

FIGS. 9A9 and 9B are block diagrams showing configurations of a learning device and an inference device according to a second example embodiment.

EXAMPLE EMBODIMENTS

Preferred example embodiments of the present invention will be described below with reference to the attached drawings.

[Basic Principle]

First, the basic principle of the object recognition method of the example embodiments will be described. In the present example embodiment, when it becomes necessary to recognize a new class in addition to the classes of the recognition target so far (hereinafter referred to as "existing class"), case example data in which case examples corresponding to the new class are registered (hereinafter also referred to as "case dictionary") is created, and the object of the new class is recognized by referring to the case dictionary. Also, as to the recognition targets of the existing classes, in order to prevent deterioration of recognition accuracy in a new environment, a plurality of metric spaces are prepared and the recognition is performed using an optimum metric space.

(1) Creating a Case Dictionary

Figure 1:
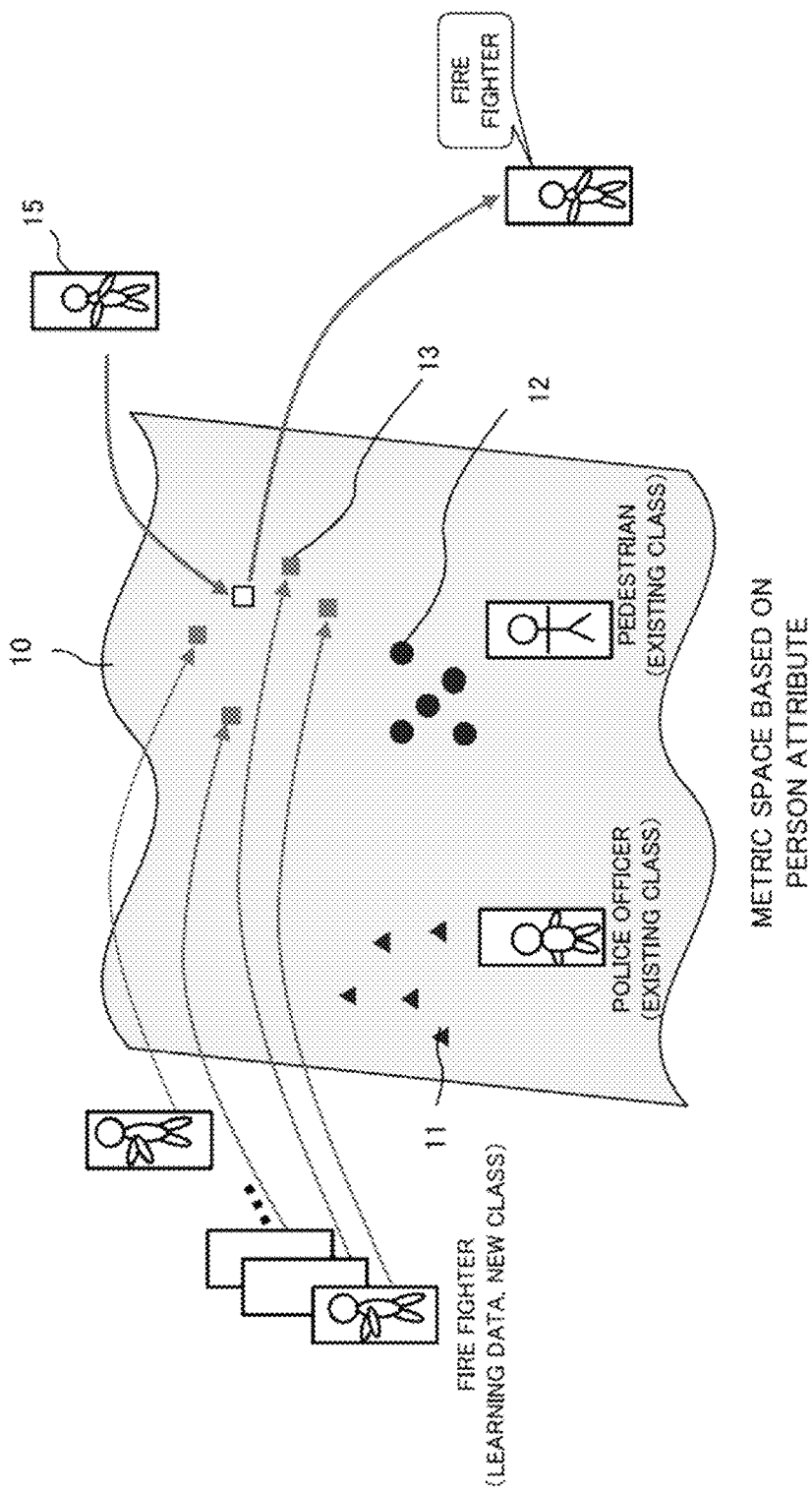
FIG. 1 is a diagram for explaining a method of creating a case dictionary of a recognition target.

FIG. 1 shows how to create a case dictionary for recognition targets including a new class. It is now assumed that there are "police officer" and "pedestrian" as the existing classes, and it is desired to recognize "fire fighter" as a new class. First, the metric space is learned using image data to which attribute information and the like are given. Specifically, the image data of the person with attribute information is acquired using public image dataset of various persons or the like. Incidentally, "attribute information" is a person attribute appearing in the image data, and includes the age, gender, height, and belongings (such as an object that is held or worn on the body) of the person, for example. In the example shown in FIG. 1, image data of various attributes are acquired for the recognition targets "police officer", "pedestrian" and "fire fighter".

Then, learning of the metric space (distance space) is performed using the acquired image data. FIG. 1 shows a metric space 10 learned based on a certain person attribute. The metric space 10 is a space defined by feature vectors (metric) extracted from the image data, and is learned to have such a characteristic that similar image data are located at a close distance and non-similar image data are located at a far distance. Specifically, a public image dataset of persons having a certain person attribute (e.g., wearing a hat) is acquired, the feature vectors are calculated for them, and the metric space is learned based on the obtained feature vectors. Note that "learning the metric space" actually refers to preparing an identification model using a neural network or the like, and learning the model so that the feature vectors generated by the model for the inputted image data have the above characteristic. Also, the metric space obtained by learning is defined by the parameters of the learned identification model.

When the learning of the metric space ends, the feature vectors are generated from the image data of the existing classes and embedded in the metric space 10 as the case examples. In the metric space 10, since the similar image data are located close to each other, the image data of the existing class "policeman" are located close to each other on the metric space 10 as shown by the marks 11 and the image data of the existing class "pedestrian" are located close to each other on the metric space 10 as shown by the marks 12. On the other hand, the "police officer" indicated by the marks 11 and the "pedestrian" indicated by the marks 12 are located apart on the metric space 10. Thus, the image data of the existing classes are embedded in the metric space 10 as the case examples. Incidentally, "embedding as a case example" actually refers to storing the feature vectors extracted from the image in association with the metric space 10.

Next, for the new class, the case examples are embedded similarly on the metric space 10. Specifically, the feature vectors are extracted from the image data of the new class "fire fighter" and embedded on the metric space 10 as the case examples. Thus, the image data of the new class "fire fighter" are located close to each other and located away from other classes "policeman" and "pedestrian" on the metric space 10 as indicated by the marks 13. Thus, on the metric space 10, the case examples of the same class are located close to each other, and the case examples of different classes are located away from each other.

When the case examples are embedded on the metric space 10 in this manner, it becomes possible to identify the class of image data with reference to these case examples. For example, as shown in FIG. 1, when an image data 15 of a certain person is inputted, the feature vector of the image data 15 is extracted to calculate its position on the metric space 10. In the example of FIG. 1, since the feature vector of the image data 15 belongs to the region where the case examples of the class "fire fighter" are gathered, the class of the image data 15 can be recognized as the "fire fighter". Thus, even if a new class is added as the recognition target, the new class can be recognized by creating the case dictionary by embedding the existing classes and the new class in the metric space.

Although FIG. 1 illustrates one metric space learned for a certain person attribute, actually the metric space 10 is learned for multiple combinations of different person attributes, respectively, and the case examples are embedded in the learned metric space 10 to create a case dictionary. The case examples for a plurality of metric spaces are registered in the case dictionary.

(2) Inference Using Case Dictionary

Figure 2:
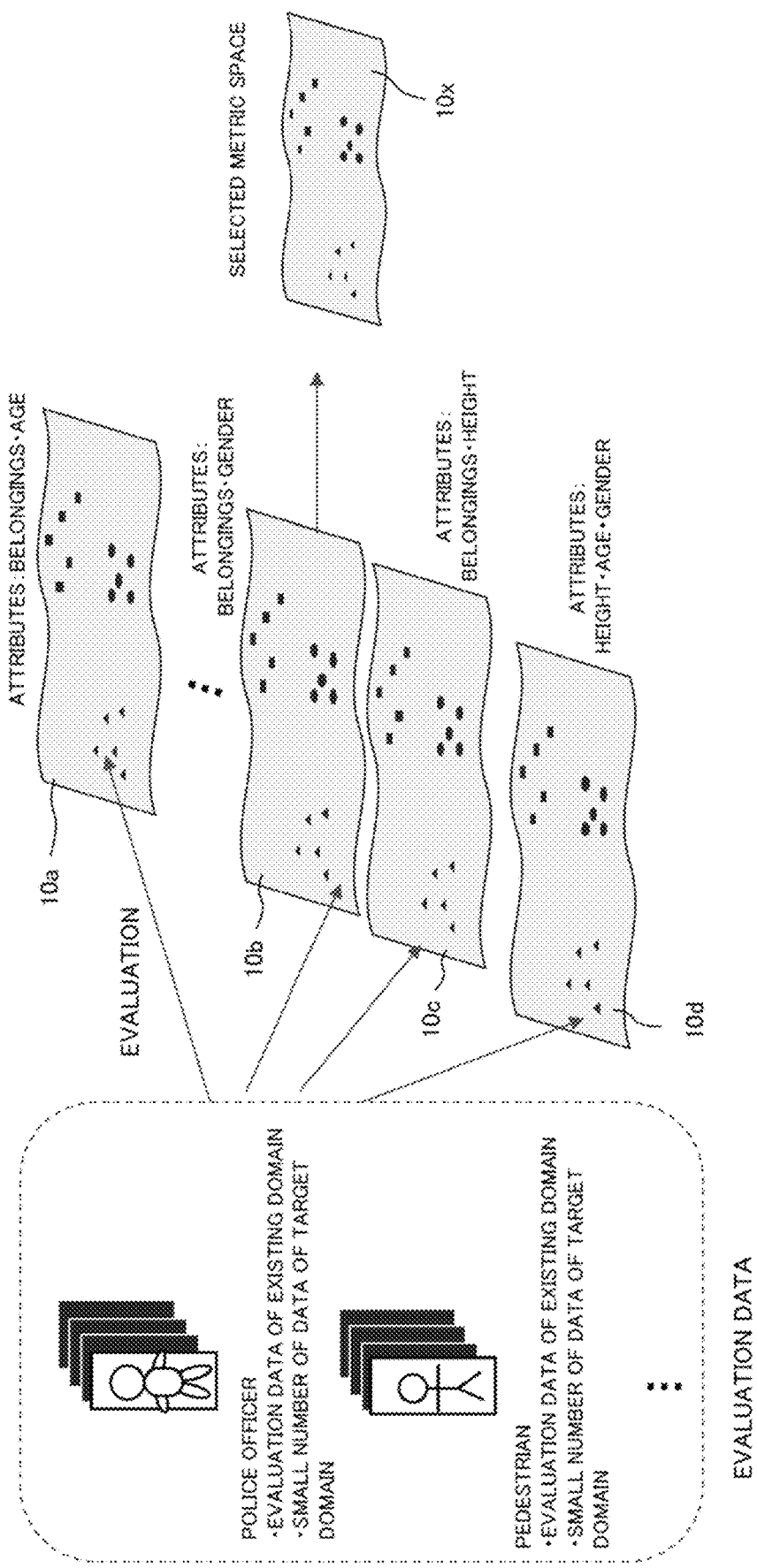
FIG. 2 is a diagram for explaining a method of selecting an optimum metric space.

When object recognition is performed using a case dictionary created, the metric space most appropriate for the environment (domain) at that time is selected, and the object recognition is performed using the metric space. FIG. 2 is a diagram illustrating a method of selecting the optimum metric space. As described above, the case dictionary includes the case examples for the plurality of metric spaces corresponding to combinations of different person attributes. Now, as shown in FIG. 2, it is assumed that the case dictionary stores the case examples for each of the metric space 10a for the attributes "belongings" and "age", the metric space 10b for the attributes "belongings" and "gender", the metric space 10c for the attributes "belongings" and "height", and the metric space 10d for the attributes "height", "age", and "gender".

Here, in order to select the optimum metric space, these metric spaces 10a to 10d are evaluated using multiple case examples of the existing classes. In the example of FIG. 2, as the evaluation data, the evaluation data of the existing domain (source domain) for the existing class "police officer" and the small number of data of the target domain, and the evaluation data of the existing domain for the existing class "pedestrian" and the small number of data of the target domain are prepared. Labels such as class information are prepared for these evaluation data. As to the above-described evaluation data, a recognition processing is performed with reference to the case examples of each metric space 10a to 10d, and the result is compared with the labels prepared in advance to calculate the coincidence degree. Then, the metric space having the highest coincidence degree is selected as the optimum metric space 10x. Thus, by selecting the optimum metric space from a plurality of metric spaces, it is possible to improve the recognition accuracy in the target domain. Incidentally, as the actual processing, the recognition of the image data of the target domain is performed using the identification model that defines the metric space selected.

First Example Embodiment

Next, a first example embodiment of the present invention will be described.

(Hardware Configuration)

Figure 3:
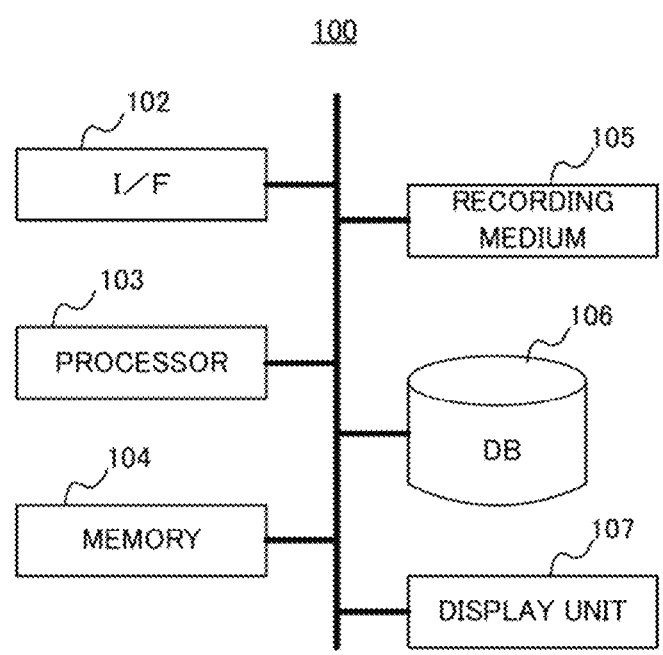
FIG. 3 is a block diagram showing a hardware configuration of an object recognition device according to a first example embodiment.

FIG. 3 is a block diagram illustrating a hardware configuration of an object recognition device according to a first example embodiment. As illustrated, the object recognition device 100 includes an interface 102, a processor 103, a memory 104, a recording medium 105, a database (DB) 106, and a display unit 107.

The interface 102 performs data input and output to and from external devices. Specifically, the image data used for learning or inference of the object recognition device 100 is inputted through the interface 102, and the recognition result of the object recognition device 100 is outputted to an external device through the interface 102.

The processor 103 is a computer such as a CPU (Central Processing Unit) or a CPU with a GPU (Graphics Processing Unit), and controls the entire object recognition device 100 by executing a program prepared in advance. Specifically, the processor 103 executes learning processing and inference processing to be described later.

The memory 104 is composed of a ROM (Read Only Memory), a RAM (Random Access Memory), or the like. The memory 104 stores a model for object recognition used by the object recognition device 100. The memory 104 stores various programs to be executed by the processor 103. Also, the memory 104 is used as a work memory during the execution of various processes by the processor 103.

The recording medium 105 is a non-volatile and non-transitory recording medium such as a disk-shaped recording medium or a semiconductor memory, and is configured to be detachable from the object recognition device 100. The recording medium 105 records various programs to be executed by the processor 103. When the object recognition device 100 performs various kinds of processing, a program recorded on the recording medium 105 is loaded into the memory 104 and executed by the processor 103.

The database 106 stores image data inputted externally. Specifically, the image data or the like used for learning of the object recognition device 100 are stored. Also, the database 106 stores the case dictionary created by the learning processing. The display unit 107 is a liquid crystal display device, for example, and displays the recognition result by the object recognition device 100 as well as additional information associated therewith. In addition to the above, the object recognition device 100 may include an input device such as a keyboard, a mouse, or the like for the user to perform instructions and input.

(Functional Configuration for Learning)

Figure 4:
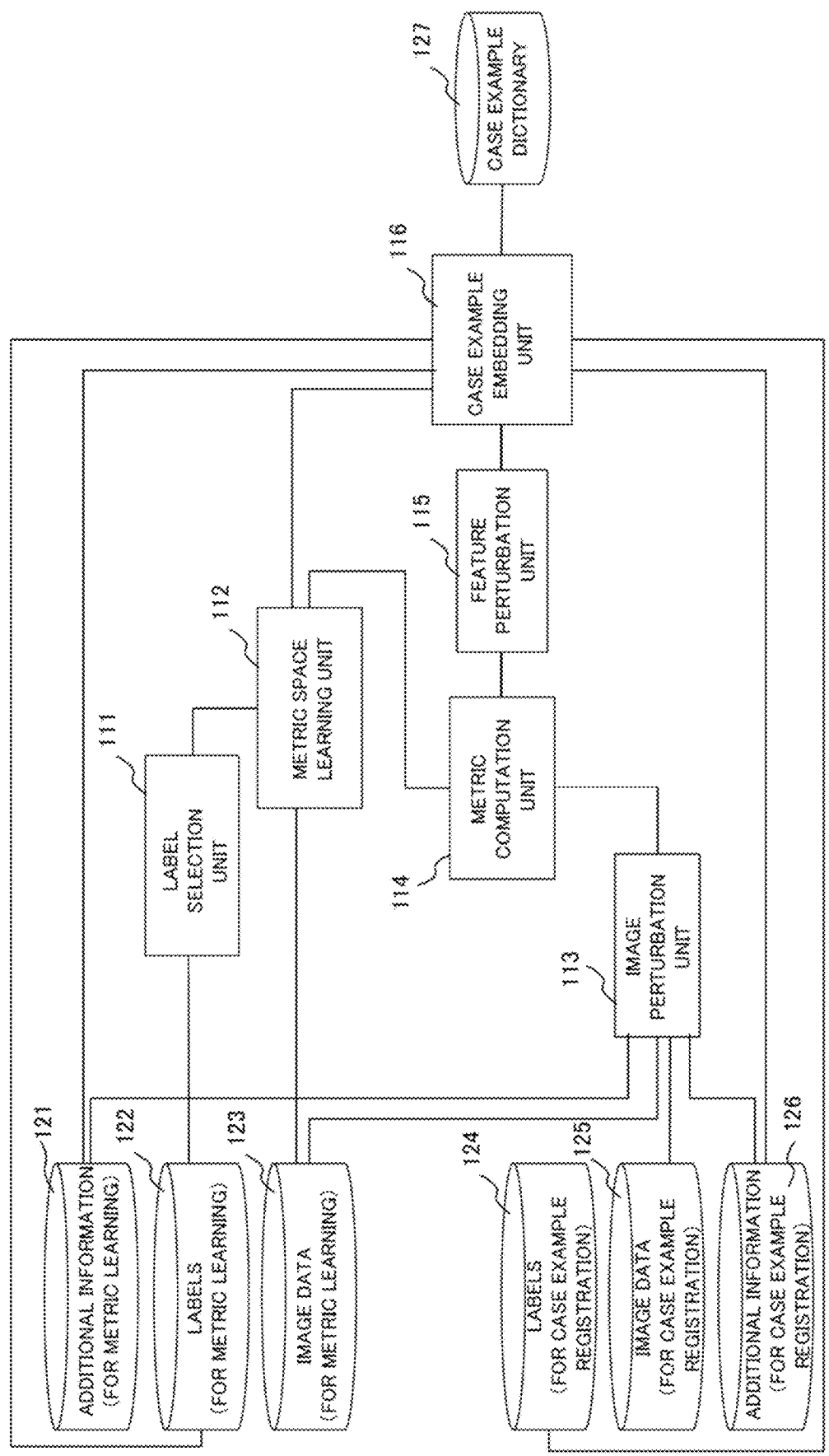
FIG. 4 is a block diagram showing a functional configuration of the object recognition device for learning.

Next, a functional configuration of the object recognition device 100 for learning will be described. FIG. 4 is a block diagram illustrating a functional configuration of an object recognition device 100A for learning. As illustrated, the object recognition device 100A includes a label selection unit 111, a metric space learning unit 112, an image perturbation unit 113, a metric computation unit 114, a feature perturbation unit 115, and a case example embedding unit 116.

To the object recognition device 100A, additional information 121, a labels 122, and image data 123 are inputted as data for metric learning. Incidentally, "data for metric learning" are data for learning the metric space. The image data 123 are image data for learning which are necessary to learn the metric space, and the aforementioned public image data set or the like can be used, for example. The labels 122 are labels associated with the image data 123, and are attribute information or class information of a person, for example. Here, the attribute information may include age, gender, height, belongings, clothing, and the like. The class information may include an individual ID, an occupation (police officer, firefighter) and the like. The additional information 121 is information to be added as the additional information to help the understanding of the information when the image data 123 and the labels 122 are registered. Examples of the additional information 121 include an imaging time, information such as a depression angle of the camera used for imaging, environmental information (air temperature, latitude and longitude, indoor/outdoor), and the like. As will be described later, the image data 123 and the labels 122 for metric learning are also used for the registration of case examples as necessary.

Further, the labels 124, the image data 125, and the additional information 126 are inputted to the object recognition device 100A as data for registering case examples. "Data for registering case examples" are data for creating the case dictionary. The image data 125 is image data for registering a case example which is necessary to register a case example, and image data is prepared for each class to be identified. The labels 124 are labels associated with the image data 125, for example, class information or the like. The additional information 126 is information that is added as additional information to help the understanding of the image data 125 and the labels 124 when the image data 125 and the labels 124 are registered. Examples of the additional information 126 include the imaging time, information such as the depression angle of the camera used for imaging, environmental information (air temperature, latitude and longitude, indoor/outdoor), and the like.

At the time of learning the metric space, the label selection unit 111 selects labels indicating attributes or the like from the labels 122. As the selection method, the label selection unit 111 may randomly select a plurality of labels, or may select a plurality of labels so that the selected labels become complementary information by using the information entropy or the like. The label selection unit 111 outputs a set of combinations of the selected labels to the metric space learning unit 112.

The metric space learning unit 112 learns the metric space based on the image data 123 for metric learning and the labels selected by the label selection unit 111. Specifically, the metric space learning unit 112 learns a distance space in which each class of the labels selected by the label selection unit 111 can be identified best. That is, as shown in FIG. 1, the metric space learning unit 112 learns the metric space such that the same classes gather nearby and different classes are located away from each other. In practice, in the identification model which extracts the feature from the image data by convolution to perform identification, the feature vector obtained at the stage just before the final identification may be used as the metric. For example, a feature vector that is obtained in a fully-connected layer in a model of CNN (Convolutional Neural Network) such as VGG may be used. The metric space thus learned is outputted to the metric computation unit 114 and the case example embedding unit 116. In practice, the parameters of the learned identification model are outputted as the metric space.

The image perturbation unit 113 receives the image data 123 and the additional information 121 for metric learning, and the image data 125 and the additional information 126 for case example registration. Here, the image data 123 for metric learning inputted to the image perturbation unit 113 are used for the case example registration. The image perturbation unit 113 perturbs the image data 123 for metric learning and the image data 125 for case example registration.

Specifically, the image perturbation unit 113 gives adversarial perturbation to the original image by geometrical deformation, image compression, addition of blurring or noise, change in lightness and/or saturation, or the like. When the parameter of the perturbation can be estimated by the additional information, the image perturbation unit 113 may perturb the image only within the range of the parameter. For example, when the parameter of the geometrical deformation can be estimated from the depression angle of the camera included in the additional information, the image perturbation unit 113 may perform the geometric deformation within the range of the parameter. The image perturbation can substantially increase the number of image data used for learning. The perturbed image data are outputted to the metric computation unit 114.

To the metric computation unit 114, the learned metric space is inputted from the metric space learning unit 112, and the image data after the perturbation are inputted from the image perturbation unit 113. The metric computation unit 114 computes a feature vector corresponding to the metric from the image data after the perturbation. That is, the metric computation unit 114 computes the position of each case example on the metric space learned by the metric space learning unit 112 using each image data perturbed as a case example. Thus, the image data 125 for case example registration is disposed on the metric space as shown in FIG. 1. In practice, the metric space learning unit 112 extracts the feature vector from each image data after the perturbation using the identification model indicating the metric space learned by the metric space learning unit 112. The feature vector extracted from each image data after the perturbation is outputted to the feature perturbation unit 115.

The feature perturbation unit 115 perturbs the feature vector of the image data obtained by the metric computation unit 114. That is, the feature perturbation unit 115 generates, as a new case example, a feature vector that exists at the farthest distance on the metric space within a certain range of variations of the image from the feature vector of each image data obtained by the metric computation unit 114. Thus, a plurality of case examples can be added around the case example that the metric computation unit 114 disposed on the metric space, and the region of each class in the metric space can be extended. The feature perturbation unit 115 outputs the feature vector generated by the perturbation and the feature vector before the perturbation, i.e., the feature vector inputted from the metric computation unit 114, to the case example embedding unit 116.

The case example embedding unit 116 embeds the feature vector inputted from the feature perturbation unit 115, i.e., the feature vector before and after the feature perturbation, in the metric space as a case example. Specifically, the case example embedding unit 116 associates the feature vector inputted from the feature perturbation unit 115 with the metric space as a case example, and registers the feature vector in the case dictionary 127. At that time, the case example embedding unit 116 also registers the labels 122 and 124 and the additional information 121 and 126 in association with each case example. Further, the case example embedding unit 116 may register representative image data as image data corresponding to the case example to be embedded in the metric space. Thus, for each combination of a plurality of labels (attributes), a case dictionary 127 in which case examples for the corresponding metric space are registered is created. Specifically, information defining a plurality of metric spaces and the case examples embedded in each metric space are stored in the case dictionary 127. Here, "information defining the metric space" are actually the parameters of the learned identification model, and "the case examples embedded in each metric space" are the feature vectors in that metric space. Incidentally, the case dictionary 127 is an example of a case example storage unit of the present invention.

(Learning Processing)

Figure 5:
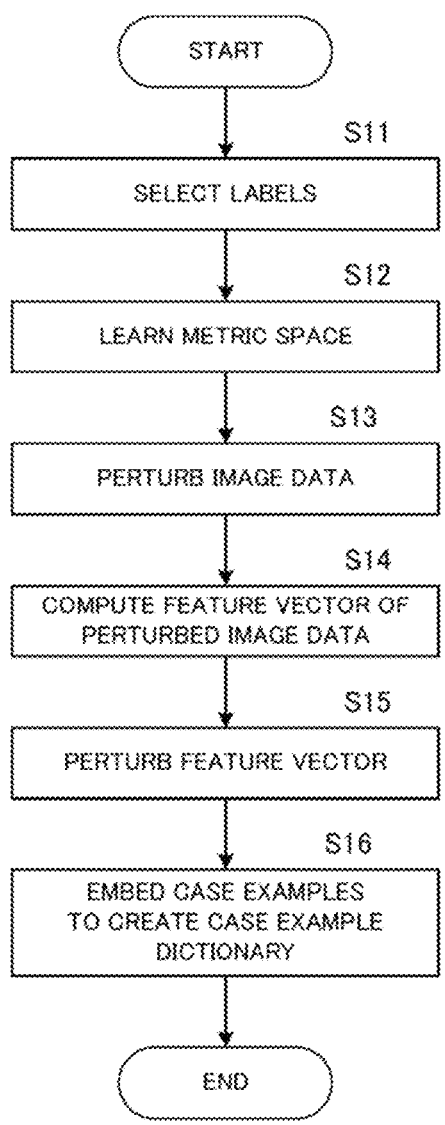
FIG. 5 is a flowchart of learning processing by the object recognition device for learning.

Next, the flow of the above learning processing will be described. FIG. 5 is a flowchart of the learning processing for learning by the object recognition device 100A. This processing is implemented by the processor 103 shown in FIG. 3 executing a program prepared in advance.

First, the label selection unit 111 selects labels including attributes and classes (Step S11). The metric space learning unit 112 learns the metric space for the combination of the labels selected in Step S11 using the image data 123 and the labels 122 for metric learning (Step S12).

Next, the image perturbation unit 113 perturbs the image data 125 for case example registration and outputs the image data after the perturbation to the metric computation unit 114 (Step S13). The metric computation unit 114 computes the feature vector of the image data after the perturbation (Step S14), and the feature perturbation unit 115 perturbs the computed feature vector (Step S15). Thus, by the perturbation of the image and the perturbation of the feature, a plurality of feature vectors can be obtained from the image data for registration. The case example embedding unit 116 creates the case dictionary 127 by storing the obtained feature vectors in association with the metric space as the case examples (step S16). Then, the learning processing ends. Thus, for the metric space for one combination of attributes, the case examples are registered in the case dictionary 127.

By changing the labels selected by the label selecting unit 111, the object recognition device 100A similarly learns the metric space for the combination of other attributes, and embeds the case examples to register them in the case dictionary 127. Thus, as illustrated in FIG. 2, the case examples arranged on the metric space corresponding to the combination of a plurality of attributes are registered in the case dictionary 127.

(Functional Configuration for Inference)

Figure 6:
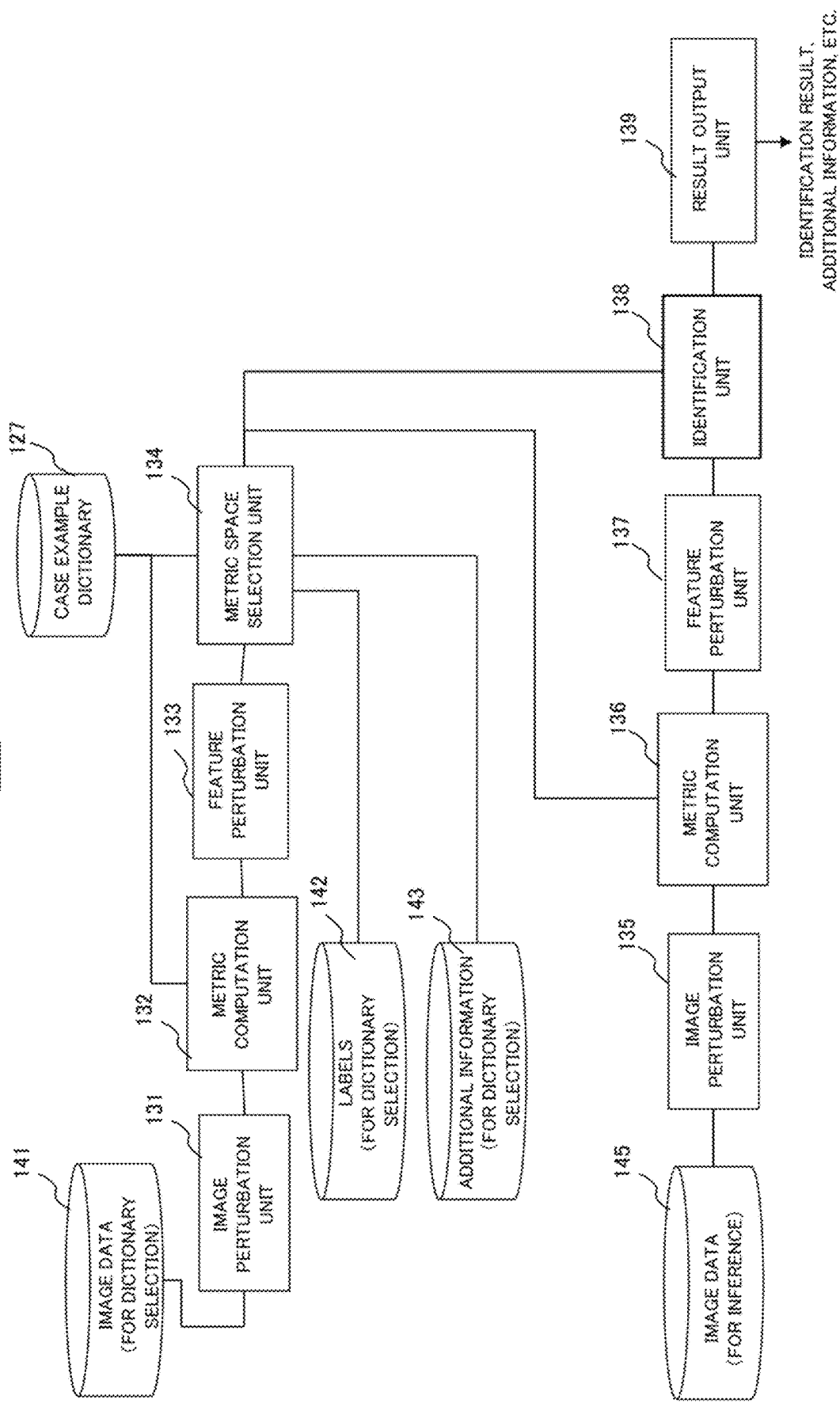
FIG. 6 is a block diagram showing a functional configuration of an object recognition device for inference.

Next, a functional configuration of the object recognition device 100 for inference will be described. FIG. 6 is a block diagram showing a functional configuration of an object recognition device 100B for inference. As illustrated, the object recognition device 100B includes an image perturbation unit 131, a metric computation unit 132, a feature perturbation unit 133, a metric space selection unit 134, an image perturbation unit 135, a metric computation unit 136, a feature perturbation unit 137, an identification unit 138, and a result output unit 139.

The object recognition device 100B uses the image data 141 for dictionary selection, the labels 142 for dictionary selection, the additional information 143 for dictionary selection, the image data 145 for inference, and the case dictionary 127. The case dictionary 127 is created by the above-described learning processing.

The image data 141 for dictionary selection is image data used to select the case dictionary 127 corresponding to the optimum metric space from the case dictionary 127 of the plurality of metric spaces prepared in advance, and the basic characteristics are the same as the image data 123 for the metric learning described above. The labels 142 for dictionary selection are labels associated with the image data 141 for dictionary selection, and the basic characteristic is the same as that of the labels 122 for metric learning. The additional information 143 for dictionary selection is the additional information associated with the image data 141 for dictionary selection, and the basic characteristic is the same as the additional information 121 for the metric learning. The image data for inference is the image data subjected to the recognition by the object recognition device 100B.

Further, the image perturbation units 131 and 135 are the same as the image perturbation unit 113 in the functional configuration for learning shown in FIG. 4. The metric computation units 132 and 136 are the same as the metric computation unit 114 in the functional configuration for learning. The feature perturbation units 133 and 137 are the same as the feature perturbation unit 115 in the functional configuration for learning.

In FIG. 6, the image perturbation unit 131, the metric computation unit 132, the feature perturbation unit 133, and the metric space selection unit 134 perform processing for selecting the optimum metric space from a plurality of metric spaces stored in the case dictionary 127 using the image data 141, the labels 142, and the additional information 143 for dictionary selection. Specifically, the image perturbation unit 131 perturbs the image data 141 for dictionary selection. The metric computation unit 132 first acquires one metric space from a plurality of metric spaces stored in the case dictionary 127, and computes a feature vector of the image data after the perturbation in the metric space. Next, the feature perturbation unit 133 perturbs the feature vector computed by the metric computation unit 132 and generates the feature vectors after the perturbation. Thus, a plurality of feature vectors are computed from the image data 141 for dictionary selection. By this processing, the number of image data used to select the optimum metric space is increased.

The image perturbation unit 131, the metric computation unit 132, and the feature perturbation unit 133 perform the same processing for the other metric spaces and compute the feature vectors in those metric spaces. Thus, for a plurality of metric spaces stored in the case dictionary 127, a plurality of feature vectors are computed based on the image data 141 for dictionary selection.

The metric space selection unit 134 selects the optimum metric space from the feature vectors computed from the image data 141 for dictionary selection as well as the corresponding labels 142 and the additional information 143. Specifically, the metric space selection unit 134 performs performance evaluation for each metric space using a technique such as nearest neighbor recognition between the labels, the feature vectors on the metric space of the image data 141 for dictionary selection, and the feature vectors of the case examples embedded in the metric spaces stored in the case dictionary 127. That is, as shown in FIG. 2, the metric space selection unit 134 evaluates the performance of a plurality of metric spaces using the image data of the existing classes, and selects the metric space having the highest performance.

Further, if it is possible to limit the metric space to be selected from the additional information 143 for dictionary selection, the metric space selection unit 134 selects the optimum metric space by the performance evaluation described above, after limiting the metric spaces to be selected in advance using the additional information 143. Alternatively, the performance evaluation described above and the selection using the additional information may be performed simultaneously. The metric space thus selected becomes a metric space that enables the most accurate recognition with respect to the attributes of the image data 141 for dictionary selection. The metric space selection unit 134 outputs the selected metric space to the metric computation unit 136 and the identification unit 138.

When the optimum metric space is selected, the inference of the image data 145 for inference is performed using the selected metric space. The image perturbation unit 135 perturbs the image data 145 for inference and outputs the image data after the perturbation to the metric computation unit 136. The metric computation unit 136 computes the feature vector of the image data after perturbation in the metric space selected by the metric space selection unit 134. Further, the feature perturbation unit 137 perturbs the feature vector computed by the metric computation unit 136 and outputs the obtained plurality of feature vectors to the identification unit 138.

The identification unit 138 performs nearest neighbor recognition or the like between the labels, a plurality of feature vectors obtained from the image data 145 for inference, and a large number of case examples stored in the case dictionary 127 for the metric space selected by the metric space selection unit 134 to identify the class of the image data 145 for inference. The identification result is supplied to the result output unit 139.

In addition to the identification result of the class by the identification unit 138, the result output unit 139 outputs the image corresponding to the case example of the neighborhood selected by the identification unit 138 as well as the label and the additional information associated with the case example. Specifically, the result output unit 139 displays those information on the display unit 107 shown in FIG. 3. Thus, even if the recognition target included in the image data 145 for inference is a new class, the user can see not only the class of the identification result but also the image, the label, the additional information, and the like of the case example close to the recognition target. Therefore, the user can intuitively determine the validity of the recognition result.

(Inference Processing)

Next, the inference processing by the object recognition device 100B for inference will be described. FIG. 7 is a flowchart of the inference processing by the object recognition device for inference. This processing is implemented by the processor 103 shown in FIG. 3 executing a program prepared in advance.

First, the image perturbation unit 131 perturbs the image data 141 for dictionary selection (Step S21), and the metric computation unit 132 computes the feature vector of the image data after the perturbation for the plurality of metric spaces (Step S22). Next, the feature perturbation unit 133 perturbs the obtained feature vector to generate a plurality of feature vectors (step S23). Then, the metric space selection unit 134 performs performance evaluation using a plurality of feature vectors and the case examples embedded in each metric space in the case dictionary 127, and selects the optimum metric space (step S24).

When the optimum metric space is thus selected, then identification of the image data 145 for inference is performed. The image perturbation unit 135 perturbs the image data 145 for inference (Step S25), and the metric computation unit 136 computes the feature vector of the image data after the perturbation for the metric space selected in Step S24 (Step S26). Next, the feature perturbation unit 137 perturbs the obtained feature vector to generate a plurality of feature vectors (Step S27), and the identification unit 138 identifies the class by a technique such as nearest neighbor recognition between the case examples in the selected metric space (Step S28). The result output unit 139 outputs the identification result of the class together with the image data, the label, and the additional information, and the like of the case example used for the identification (Step S29). Then, the inference processing ends.

(Display Example of Identification Result)

Figure 8A:
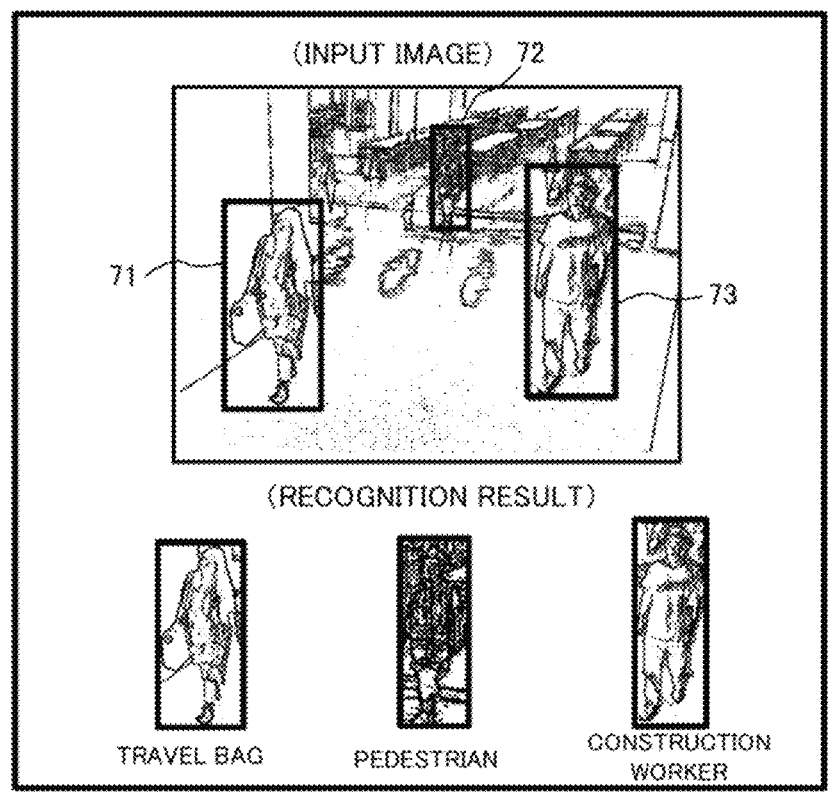
FIGS. 8A and 8B are display examples of object recognition results.
Figure 8B:
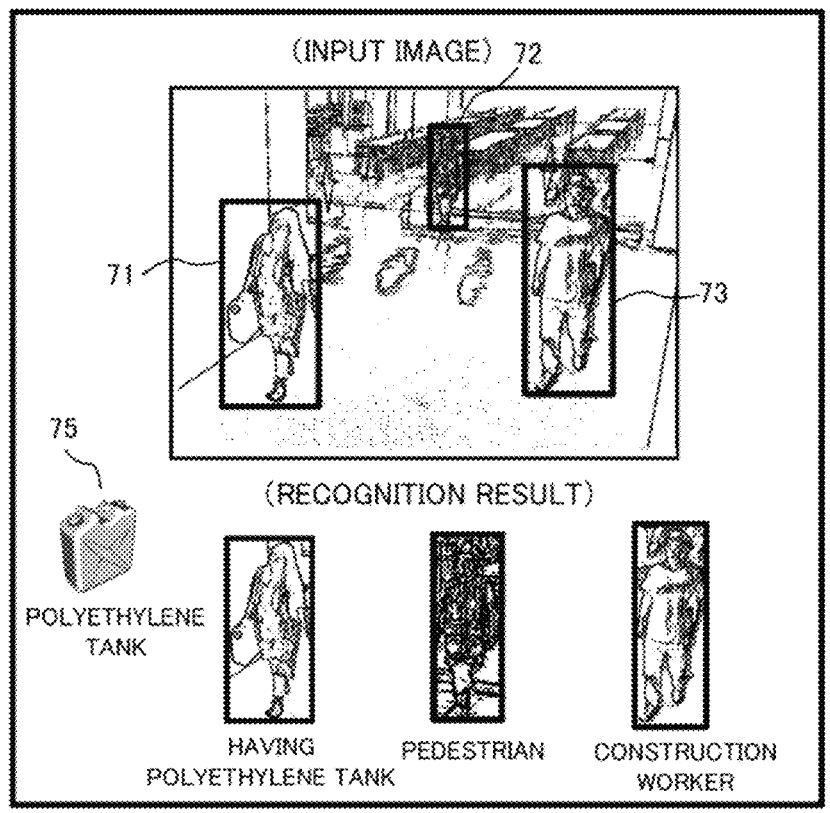

FIG. 8 shows a display example of the recognition result by the above-mentioned inference processing. FIG. 8A shows a display example of recognition results before adding a polyethylene tank as a new class. Three objects 71-73 are recognized in the input image. The object 71 is actually a person who carries a polyethylene tank, but since the polyethylene tank is not registered as a recognition target class, the recognition result is "travel bag". The object 72 is a pedestrian and the object 73 is a construction worker, and these correspond to the existing classes. Therefore, correct recognition results are outputted. FIG. 8B shows a display example of the recognition result after the addition of a polyethylene tank as a new class by the method of the above-described example embodiment. Since a polyethylene tank has been added as a new class, the object 71 is correctly recognized as a "polyethylene tank". Further, since the representative image data of the new class "polyethylene tank" is registered in the case dictionary, the image data 75 is displayed together. As described above, since the additional information such as a representative image is outputted together with the recognition result, the user can intuitively judge the validity of the recognition result.

(Modifications)

(1) In the above inference processing, the metric space selection unit 134 evaluates a plurality of metric spaces using the image data of the existing class as the evaluation data, and selects the optimum metric space. In addition to this, the metric space selection unit 134 may use the image data of a new class as the evaluation data. In this case, it is conceivable that the correct label (correct class) is not prepared for the image data of the new class. However, even in that case, when a plurality of case examples of the new class form a bundle at a position away from the case examples of other existing classes on the metric space, it can be evaluated that the metric space has appropriate performance. Therefore, when a set of the case examples of the new class are located in a narrower region and is away from the sets of the case examples other than the new class on the metric space, that metric space may be selected as a case dictionary of best characteristic. More specifically, for each of the case examples of the new class, the ratio of the average value A of the distance between the case example in question and other case examples in the new class and the average value B of the distance between the case example in question and the case examples in the existing classes may be obtained, and one having a small ratio may be selected.

(2) In the above-described example embodiment, the metric space is learned using the person attribute data (belongings, age, etc.) and the person class data (police officer, fire fighter, etc.). Instead, the metric space may be learned using only the person attribute data, and the relearning (fine tuning) of the metric space may be performed using the obtained metric space as an initial value and using the person class data. Then, the performance of the relearned metric space may be evaluated to select the optimum metric space.

(3) In the above-described example embodiment, the metric space is learned based on the person attribute data and the person class data. In this case, the weights in the neural network may be shared by both the person attribute identification task and the person class identification task. Specifically, when optimization (learning of the metric space) is performed, the weights may be set for the loss function of the person attribute identification task and the loss function of the person class identification task to perform learning. For example, for the loss function of the person attribute identification task and the loss function of the person class identification task, the contribution (coefficient) of either one of the loss functions is increased in the first half of the optimization, and the contribution (coefficient) in the loss function of the one is decreased in the second half of the optimization. By this, since it becomes possible to obtain the model capable of identifying both the person attribute and the person class, the identification of higher performance can be expected.

In addition, since the person attribute data can be used, it is effective when the number of person class data is small. Generally, public image data sets and the like include a large number of person attribute data, but the number of person class data is often small. Therefore, the learning is started by increasing the weight for the loss function of the person attribute identification task, and then the learning is performed by increasing the weight for the loss function of the person class identification task to specialize in each person class. This makes it possible to learn the metric space by effectively utilizing the person class data even in the situation that the number of the person attribute data is large and the number of person class data is small.

(4) In the above example embodiment, the image data is perturbed by the image perturbation unit. The following methods may be used as the method of image perturbation. As the first method, the images of persons are divided into partial regions such as the parts of the body (head, torso, hands, feet, etc.) respectively, and they are bonded together to generate an image of a person. Incidentally, the boundary portion of the body parts is subjected to image processing such as alpha blending. As the second method, first, the joint positions of the human body included in the image data is detected by the key point detection. Then, geometric transformations such as affine transformation, Helmert transformation, homography transformation, B-spline interpolation, or the like are used to normalize the positions of the key points and generate images with aligned joint positions. Then, the position of the key point is shifted minutely by the addition of noise or the like, and perturbation is given.

Also, the feature perturbation unit may generate micro-perturbation case examples using adversary case example generation. Specifically, when adding minute noise to the input image, a case example whose distance from the case example group of the same class is longest is adopted. Namely, the case example obtained by giving minute noise to the input image is adopted if it is far from the existing case example on the metric space, and it is not adopted if it is close to the existing case example.

(5) In the above example embodiment, the image and the feature vector are perturbed in the learning of the metric space and the selection of the metric space, However, if a sufficient amount of image data can be prepared, it is not necessary to perform the perturbation of the image and the feature vector.

Second Example Embodiment

Figure 9A:
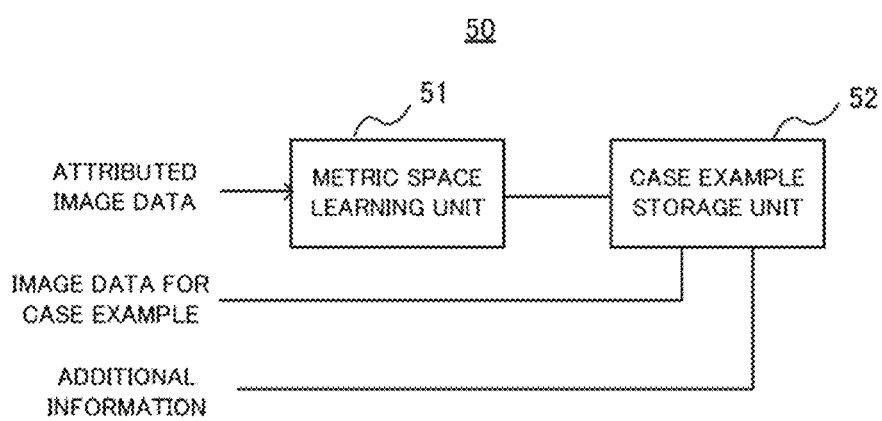

Next, a second example embodiment of the present invention will be described. FIG. 9A shows the configuration of the learning device 50 according to the second example embodiment. The learning device 50 includes a metric space learning unit 51 and a case example storage unit 52. The metric space learning unit 51 learns a metric space including feature vectors extracted from attributed image data, for each combination of different attributes, using the attributed image data to which attribute information is assigned. The case example storage unit 52 computes the feature vector from the image data for case example to store the computed feature vector as a case example associated with the metric space, and stores additional information associated with the case example. Thus, a metric space is learned for each combination of different attributes, and the case examples and additional information are stored in association with the metric space.

Figure 9B:
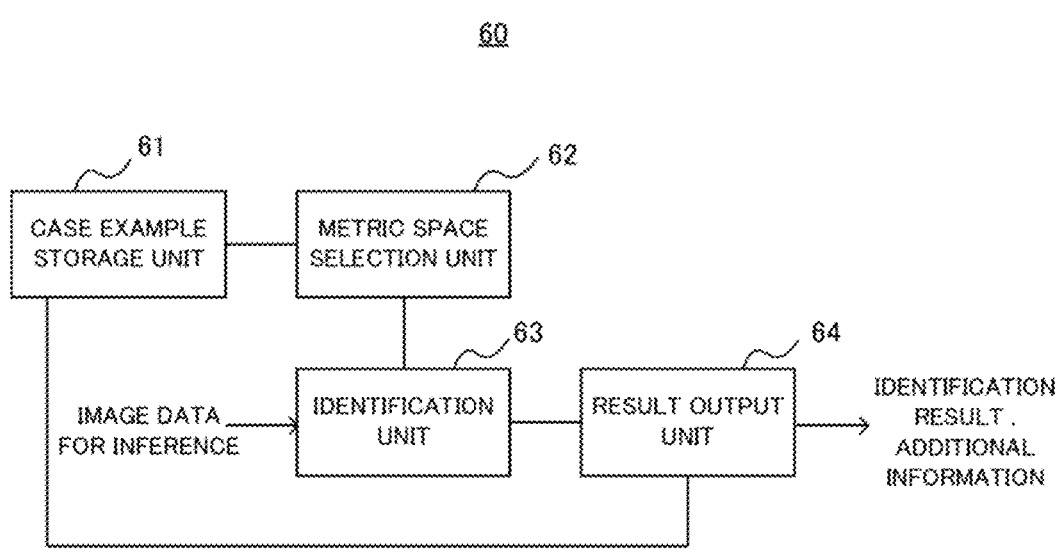

FIG. 9B shows the configuration of the inference device according to the second example embodiment. The inference device 60 includes a case example storage unit 61, a metric space selection unit 62, an identification unit 63, and a result output unit 64. The case example storage unit 61 stores a feature vector of the image data for case example as an case example in association with a plurality of metric spaces learned for each combination of different attributes, and stores additional information associated with the case example. The metric space selection unit 62 acquires the plurality of metric spaces from the case example storage unit 61, evaluates the plurality of metric spaces using the feature vectors of the image data for selection to select one metric space. The identification unit 63 identifies the image data for inference based on the feature vector extracted from the image data for inference and the case example associated with the one metric space. The result output unit 64 outputs the identification result by the identification unit 63 together with the additional information associated with the case example used for the identification. Thus, using the case example stored in the case example storage unit 61, it is possible to identify the image data for inference and output it together with the additional information associated with the case example used for the identification.

A part or all of the example embodiments described above may also be described as the following supplementary notes, but not limited thereto.

(Supplementary Note 1)

A learning device comprising:

a metric space learning unit configured to learn a metric space including feature vectors extracted from attributed image data, for each combination of different attributes, using the attributed image data to which attribute information is assigned; and a case example storage unit configured to compute the feature vector from the image data for case example to store the computed feature vector as a case example associated with the metric space, and store additional information associated with the case example.

(Supplementary Note 2)

The learning device according to Supplementary note 1, wherein the additional information includes representative image data corresponding to the case example.

(Supplementary Note 3)

The learning device according to Supplementary note 2, wherein the additional information includes any one of a label, an imaging condition, and environmental information of the image data for case example.

(Supplementary Note 4)

A learning method comprising:

learning a metric space including feature vectors extracted from attributed image data, for each combination of different attributes, using the attributed image data to which attribute information is assigned; and computing the feature vector from the image data for case example to store the computed feature vector as a case example associated with the metric space, and storing additional information associated with the case example.

(Supplementary Note 5)

A recording medium recording a program causing a computer to execute processing of:

learning a metric space including feature vectors extracted from attributed image data, for each combination of different attributes, using the attributed image data to which attribute information is assigned; and computing the feature vector from the image data for case example to store the computed feature vector as a case example associated with the metric space, and storing additional information associated with the case example.

(Supplementary Note 6)

An inference device comprising:

a case example storage unit configured to store a feature vector of image data for case example in association with a metric space learned for each combination of different attributes, and store additional information associated with the case example;

an identification unit configured to identify image data for inference based on the feature vector extracted from the image data for inference and the case example associated with the metric space; and a result output unit configured to output an identification result by the identification unit with the additional information associated with the case example used for identification.

(Supplementary Note 7)

The inference device according to Supplementary note 6, further comprising a metric space selection unit configured to acquire a plurality of metric spaces from the case example storage unit and evaluate the plurality of metric spaces using the feature vectors of the image data for selection to select one metric space, wherein the identification unit identifies the image data for inference based on the feature vector extracted from the image data for inference and the case example associated with the one metric space.

(Supplementary Note 8)

The inference device according to Supplementary note 6 or 7, wherein the additional information includes representative image data corresponding to the case example, and wherein the result output unit displays the identification result and the representative image data on a display device.

(Supplementary Note 9)

The inference device according to any one of Supplementary notes 6 to 8, wherein the additional information includes any one of a label, an imaging condition, and environmental information of the image data for case example.

(Supplementary Note 10)

An inference method comprising:

acquiring a metric space from a case example storage unit which stores a feature vector of image data for case example in association with a metric space learned for each combination of different attributes, and which stores additional information associated with the case example;

identifying image data for inference based on a feature vector extracted from the image data for inference and the case example associated with the metric space; and outputting an identification result by the identification unit with the additional information associated with the case example used for identification.

(Supplementary Note 11)

A recording medium recording a program causing a computer to execute processing of:

acquiring a metric space from a case example storage unit which stores a feature vector of image data for case example in association with a metric space learned for each combination of different attributes, and which stores additional information associated with the case example;

identifying image data for inference based on a feature vector extracted from the image data for inference and the case example associated with the metric space; and outputting an identification result by the identification unit with the additional information associated with the case example used for identification.

While the present invention has been described with reference to the example embodiments and examples, the present invention is not limited to the above example embodiments and examples. Various changes which can be understood by those skilled in the art within the scope of the present invention can be made in the configuration and details of the present invention.

DESCRIPTION OF SYMBOLS

10 Metric space
100 Object recognition device
103 Processor
111 Label selection unit
112 Metric space learning unit
113, 131, 135 Image perturbation unit
114, 132, 136 Metric computation unit
115, 133, 137 Feature perturbation unit
116 Case embedding unit
127 Case dictionary
170 Terminal device
138 Identification unit
129 Result output unit

What is claimed is:

1. An inference device comprising:
a memory configured to store instructions; and
one or more processors configured to execute the instructions to:
store a feature vector of image data for case example in association with a metric space learned for each combination of different attributes, and store additional information associated with the case example by a learning method;
wherein the learning method comprises:
learning a metric space including feature vectors extracted from attributed image data, for each combination of different attributes, using the attributed image data to which attribute information is assigned; and
computing the feature vector from the image data for case example to store the computed feature vector as a case example associated with the metric space, and storing additional information associated with the case example;
identify image data for inference based on the feature vector extracted from the image data for inference and the case example associated with the metric space; and
generate, using the additional information associated with the case example used for identification, an identification result.

2. The inference device according to claim 1, the one or more processors are further configured to acquire a plurality of metric spaces from the case example storage and evaluate the plurality of metric spaces using the feature vectors of the image data for selection to select one metric space,
  wherein the one or more processors identify the image data for inference based on the feature vector extracted from the image data for inference and the case example associated with the one metric space.

3. The inference device according to claim 1,
  wherein the additional information includes representative image data corresponding to the case example, and
  wherein the one or more processors are further configured to execute the instructions to display the identification result and the representative image data on a display device.

4. The inference device according to claim 1, wherein the additional information includes any one of a label, an imaging condition, and environmental information of the image data for case example.

5. The inference device according to claim 1, wherein the additional information includes representative image data corresponding to the case example.

6. The inference device according to claim 5, wherein the additional information includes any one of a label, an imaging condition, and environmental information of the image data for case example.

7. An inference method comprising:
  acquiring a metric space from a case example storage which stores a feature vector of image data for case example in association with a metric space learned for each combination of different attributes, and which stores additional information associated with the case example, the case example storage being created by a learning method;
  wherein the learning method comprises:
    learning a metric space including feature vectors extracted from attributed image data, for each combination of different attributes, using the attributed image data to which attribute information is assigned; and
    computing the feature vector from the image data for case example to store the computed feature vector as a case example associated with the metric space, and storing additional information associated with the case example;
  identifying image data for inference based on a feature vector extracted from the image data for inference and the case example associated with the metric space; and
  generating, using the additional information associated with the case example used for identification, an identification result.

8. The inference method according to claim 7, wherein the additional information includes representative image data corresponding to the case example.

9. The inference method according to claim 8, wherein the additional information includes any one of a label, an imaging condition, and environmental information of the image data for case example.

10. A non-transitory computer-readable recording medium recording a program causing a computer to execute processing of:
  acquiring a metric space from a case example storage unit-which stores a feature vector of image data for case example in association with a metric space learned for each combination of different attributes, and which stores additional information associated with the case example, the case example storage being created by a learning method;
  wherein the learning method comprises:
    learning a metric space including feature vectors extracted from attributed image data, for each combination of different attributes, using the attributed image data to which attribute information is assigned; and
    computing the feature vector from the image data for case example to store the computed feature vector as a case example associated with the metric space, and storing additional information associated with the case example;
  identifying image data for inference based on a feature vector extracted from the image data for inference and the case example associated with the metric space; and
  generating, using the additional information associated with the case example used for identification, an identification result.

11. The recording medium according to claim 10, wherein the additional information includes representative image data corresponding to the case example.

12. The recording medium according to claim 11, wherein the additional information includes any one of a label, an imaging condition, and environmental information of the image data for case example.

* * * * *